United States Patent
Le Deit et al.

[19]

[11] Patent Number: 5,810,122
[45] Date of Patent: Sep. 22, 1998

[54] DISK BRAKE WITH IMPROVED FITTING

[75] Inventors: Gerard Le Deit, Courtry; Jean Louis Gerard, Bagnolet; Jean Claude Mery, Pavillons-sous-Bois, all of France; Pasquale Tribuzio, Bitonto; Nicolas Tristano, Matera, both of Italy

[73] Assignee: Bosch Systems de Freinage, Drancy, France

[21] Appl. No.: 537,713

[22] PCT Filed: Sep. 20, 1995

[86] PCT No.: PCT/FR95/01206

§ 371 Date: Oct. 17, 1995

§ 102(e) Date: Oct. 17, 1995

[87] PCT Pub. No.: WO96/12117

PCT Pub. Date: Apr. 25, 1996

[30] Foreign Application Priority Data

Oct. 13, 1994 [FR] France .................................. 94 12184

[51] Int. Cl.⁶ ...................................................... F16D 65/14
[52] U.S. Cl. ...................................................... 188/73.45
[58] Field of Search ............................ 188/73.45, 71.8, 188/72.4, 73.39, 73.42, 73.44, 205 R, 206 R

[56] References Cited

U.S. PATENT DOCUMENTS

| | | | |
|---|---|---|---|
| 4,446,948 | 5/1984 | Melinat | 188/73.45 |
| 4,976,339 | 12/1990 | Le Marchand | 188/73.45 |
| 5,526,904 | 6/1996 | Walden et al. | 188/73.45 |

*Primary Examiner*—Lee W. Young
*Attorney, Agent, or Firm*—Leo H. McCormick, Jr.

[57] ABSTRACT

A disk brake having a caliper (1) which straddles a disk (2), a carrier (3) fixed to the vehicle, a cylinder (4) secured to the caliper and closed by a piston (5) and two friction pads (10,11). Two cylindrical and mutually parallel guide pins which slide in corresponding housings. These housings being partially formed by bores (8, 9) made in the carrier (3) for maintaining the caliper (1) with the cylinder (4). The first bore (8), over first and second contiguous sections (s1, S2) of its length, has first and second respective inside diameters (D1, D2), the second diameter (D2) of which is greater than the first diameter (D1). The smaller diameter (D1) being formed on the same side of the first housing as the opening of the bore (8) and the first housing is formed, in addition to the first bore (8), from inside (130) a ring (13) made of elastomeric material.

4 Claims, 1 Drawing Sheet

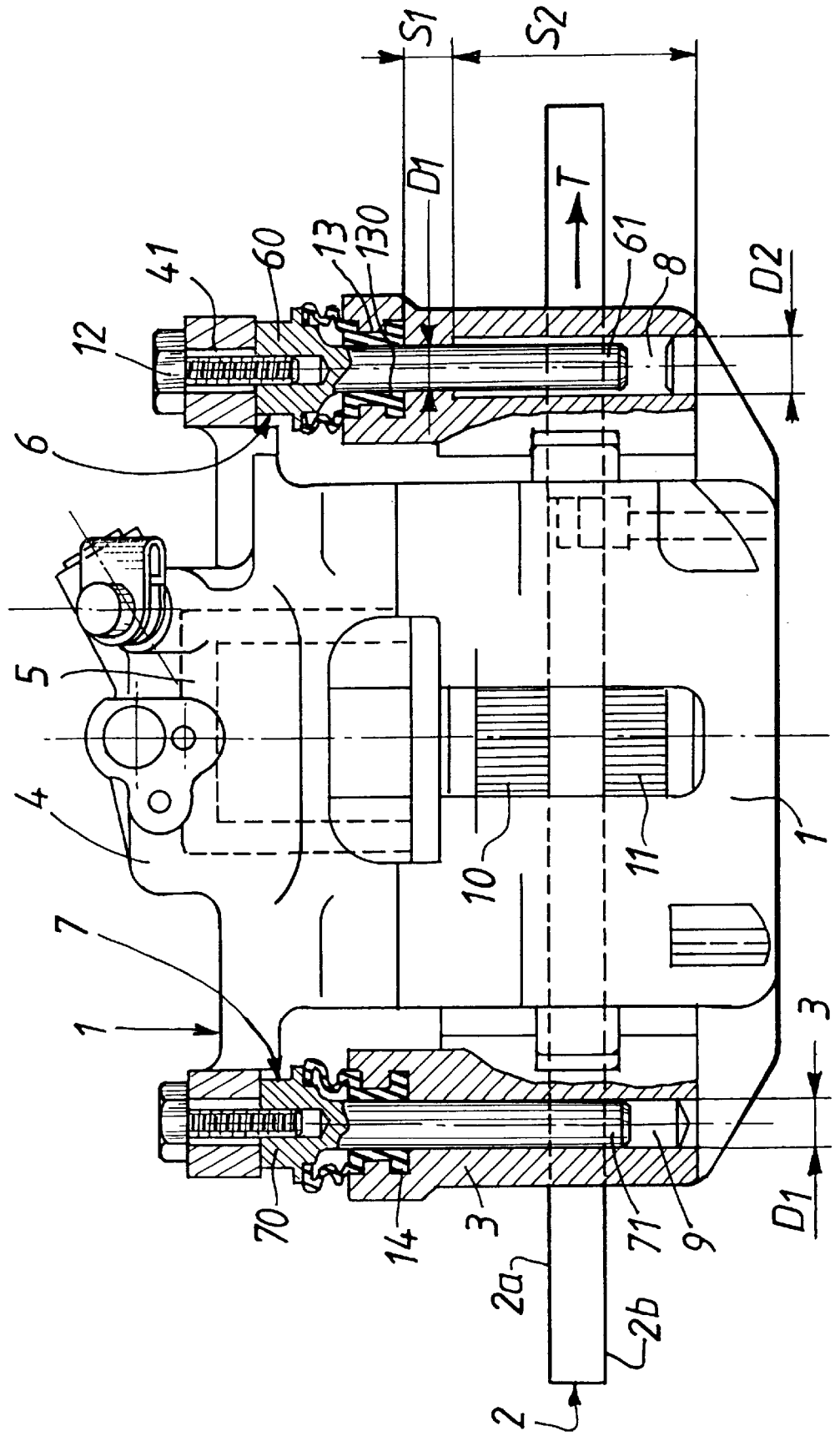

DISK BRAKE WITH IMPROVED FITTING

The present invention relates to a disk brake for a motor vehicle comprising: a caliper straddling a brake disk; a carrier fixed to the vehicle; application means comprising a cylinder secured to the caliper and closed by a piston; guide means allowing the caliper to slide relative to the carrier when the application means are actuated, these guide means themselves including first and second identical cylindrical guide pins parallel to each other and each having a bound end fixed to the caliper and a free end, and first and second housings at least partially formed by first and second respective bores made in the carrier and in which the first and second guide pins respectively slide, at least one of these guide pins being fixed to the caliper by adjustable fixing means, allowing it, before it is permanently fixed to the caliper, to adopt a plurality of possible positions spaced apart from one another in a direction tangential to the disk; and two friction pads pointing towards opposite faces of the disk, trapped between the piston and the caliper and applied to the disk when the application means are actuated.

Such brakes are well known in the prior art, as shown, for example, by the document FR-A-2,353,755, or the equivalent document GB-A-1,572,451.

The production of brakes of this type, known as "sliding-caliper brakes", runs into several difficulties, especially in obtaining accurate centring of the guide pins in the housings in the carrier at the moment of fitting the brake, and in obtaining good sliding of these guide pins in the housings when this brake is actuated.

It has been proposed to solve these difficulties by giving the guide pins different cross sections, and by contriving for the free end of the more slender of them to be matched to the inside diameter of the corresponding housing by means of a flexible sleeve, the rest of the length of this guide pin in contrast having a smaller diameter so that it can slide in the housing with a very substantial clearance.

A brake of this type is described, for example, in the patent application JP-A-1,224,530 published on 7 Sep., 1989.

In practice, such a brake, however, poses quite tricky fitting problems, the guide pins tending to offcentre at the moment when they are screwed onto the caliper.

The invention falls within this context and its object is to provide a sliding-caliper disk brake whose structure is simple and which is easy to fit.

To this end, the brake of the invention which moreover complies with the preamble hereinabove, is essentially characterized in that the first bore, over first and second contiguous sections of its length, has first and second respective inside diameters, the second of which is greater than the first, the smaller diameter being formed in that one of the two sections of the first bore that the first guide pin encounters first when penetrating therein, and in that the first housing is formed, in addition to the first bore, from inside a ring of elastomeric material located in the extension of the first section of the first bore so that it is contiguous with this first section and some distance from the second section.

Preferably, the first section furthermore has a shorter length than that of the second section, and the second housing is at least partially formed by a second ring made of an elastomeric material, similar to the first one.

Other features and advantages of the invention will emerge clearly from the description thereof given hereafter by way of non-limiting indication with reference to the appended drawings in which the single FIGURE is a partial sectional view of a brake in accordance with the invention.

As this FIGURE shows, the invention relates to a disk brake for a motor vehicle comprising: a caliper 1 straddling a brake disk 2; a carrier 3 fixed to the vehicle; application means comprising a cylinder 4 secured to the caliper and closed by a piston 5; guide means 6, 7, 8, 9 allowing the caliper to slide relative to the carrier when the application means are actuated; and two friction pads 10, 11 pointing towards opposite faces 2a, 2b of the disk 2, trapped between the piston and the caliper and applied to the disk when the application means are actuated.

The guide means themselves comprise first and second identical cylindrical guide pins 6, 7 parallel to each other and each having a bound end 60, 70 fixed to the caliper and a free end 61, 71 and first and second housings partially formed by first and second respective bores 8, 9 made in the carrier, and in which the first and second guide pins respectively slide.

At least one of the guide pins, for example the guide pin 6, is fixed to the caliper by a screw 12 passing with clearance through an orifice 41 in the caliper, this screw thus allowing the guide pin 6, before it is permanently fixed to the caliper, to adopt a plurality of possible positions spaced apart from one another in a direction T tangential to the disk, depending on the position that the screw 12 itself adopts in the orifice 41.

According to the invention, the first bore 8, over first and second contiguous sections S1 and S2 of its length, has first and second respective inside diameters D1 and D2, the second D2 of which is greater than the first D1, the smaller diameter D1 being formed in that one of the two sections S1 of the first bore 8 that the first guide pin 6 encounters first while penetrating therein.

In fact, the term "bore" in the present description and in the claims should be understood in a very wide sense, it being possible, for example, for the stepped bore 8 to be produced from a cylindrical bore inside which a rigid ring of inside diameter D1 is forcibly fitted, covering and forming the first section S1.

Moreover, the first housing is formed, in addition to the first bore 8, from inside 130 a ring 13 of elastomeric material located in the extension of the first section S1 of the first bore 8, so that it is contiguous with this first section S1 and some distance from the second section S2.

In addition, the ring 13 fulfils a function of centring the guide pin, making it possible to place the latter in an optimum position and damp out vibration of the caliper.

By virtue of this arrangement, not only does recourse to a first section S1 of small diameter in the bore of the carrier allow two identical guide pins to be used while nevertheless ensuring accurate centring of these guide pins in the corresponding bores, but the precision with which the first guide pin is installed in the first bore is even improved by the fact that this guide pin is guided, upon fitting, by the first section S1 close to the bound end 60 of this guide pin 8.

Preferably, the first section S1 of the first bore 8 furthermore has a length shorter than that of the second section S2, and the second housing is at least partially formed by a second ring 14 of elastomeric material, similar to the first ring 13, the second bore 9 over its entire length having the same diameter D1 as the first section S1 of the first bore 8, and receiving the second guide pin 7 with slight clearance over its entire length.

We claim:

1. A disk brake comprising:
   a caliper which straddles a brake disk;
   a fixed carrier;
   application means comprising a cylinder secured to said caliper and closed by a piston;

guide means allowing said caliper to slide relative to the carrier when the application means are actuated, said guide means including first and second identical cylindrical guide pins parallel to each other and each having a bound end fixed to said caliper and a free end;

first and second housings at least partially formed by first and second respective bores made in the carrier and in which the first and second guide pins respectively slide, at least one of these guide pins being fixed to said caliper by adjustable fixing means, allowing said one guide pin, before it is permanently fixed to said caliper, to adopt a plurality of possible positions spaced apart from the other of said guide pins in a direction tangential to said disk; and two friction pads pointing towards opposite faces of the disk and trapped between the piston and the caliper, said two friction pads being applied to the disk when the application means are actuated, said first bore, over first and second contiguous sections of its length, having first and second respective inside diameters, said second diameter being greater than said first diameter, said first guide pin on encountering said first section penetrating said first bore, characterized in that said first housing is formed, in addition to the first bore by an inner surface of a ring of elastomeric material located in an extension of the first section of the first bore so that it is contiguous with this first section and some distance from the second section, and in that said second bore over its entire length has a diameter equal to the said first diameter.

2. The disk brake according to claim 1, characterized in that said first section has a length which is less than that of said second section.

3. The disk brake according to claim 1, characterized in that said second housing is at least partially formed by a second ring made of elastomeric material.

4. The disk brake according to claim 2, characterized in that said second housing is at least partially formed by a second ring made of elastomeric material.

* * * * *